United States Patent
Man et al.

(10) Patent No.: US 11,207,798 B1
(45) Date of Patent: Dec. 28, 2021

(54) MULTI-SET CLAMPING FIXTURE FOR DIAMOND MACHINING

(71) Applicant: Shanghai Zhengshi Technology Co., Ltd., Shanghai (CN)

(72) Inventors: Weidong Man, Shanghai (CN); Changzheng Zhu, Shanghai (CN); Chuang Gong, Shanghai (CN); Jianbo Wu, Shanghai (CN); Jianhong Jiang, Shanghai (CN); Wu Yang, Shanghai (CN)

(73) Assignee: Shanghai Zhengshi Technology Co., Ltd., Shanghai (CN)

( * ) Notice: Subject to any disclaimer, the term of this patent is extended or adjusted under 35 U.S.C. 154(b) by 0 days.

(21) Appl. No.: 17/371,166

(22) Filed: Jul. 9, 2021

(30) Foreign Application Priority Data

Dec. 1, 2020 (CN) .......................... 202011395345.3

(51) Int. Cl.
  *B28D 5/00* (2006.01)
  *B24B 9/16* (2006.01)
  *B23Q 3/08* (2006.01)

(52) U.S. Cl.
  CPC ........... *B28D 5/0094* (2013.01); *B23Q 3/088* (2013.01); *B24B 9/163* (2013.01); *B23Q 2703/04* (2013.01)

(58) Field of Classification Search
  CPC ... B25B 1/2415; B25B 1/2421; B25B 1/2463; B25B 5/003; B25B 5/065; B25B 5/14;
  (Continued)

(56) References Cited

U.S. PATENT DOCUMENTS

| 2,654,979 | A | 10/1953 | Grodzinski |
| 2012/0167362 | A1* | 7/2012 | Smith ................... B24B 9/167 29/10 |

FOREIGN PATENT DOCUMENTS

| CN | 1647765 A | 8/2005 |
| CN | 102574261 A | 7/2012 |

(Continued)

OTHER PUBLICATIONS

The notification of first office action in CN 202011395345.3, issued by CNIPA, dated Apr. 30, 2021.

(Continued)

*Primary Examiner* — Tyrone V Hall, Jr.
*Assistant Examiner* — Makena S Markman
(74) *Attorney, Agent, or Firm* — Zhu Lehnhoff LLP

(57) ABSTRACT

The invention discloses a multi-set clamping fixture for diamond machining, which is used for machining diamonds. The clamping fixture includes a base shell, a lip ring, and a sealing ring. The upper end of the base shell is opened, the lip ring is arranged at the inner ring position of the base shell, an embedding groove is arranged at the inner ring position of the lip ring, the sealing ring is arranged in the embedding groove, a vacuum cavity is formed in the base shell, and the base shell is externally connected with a vacuum pumping pipeline. After the pavilion portion of a diamond to be machined is inserted into the lip ring and supported by the sealing ring, a vacuum cavity is formed in the base shell, the vacuum cavity is vacuumized by the external pipeline, and then the diamond is limited at the position of the lip ring to complete the clamping process. The lip ring is connected with the base shell in a detachable structure. An annular air pressure cavity is arranged on the outer edge of the upper portion of the base shell, one ends of a plurality of auxiliary clamping rods are located in the air pressure cavity, and one ends of the auxiliary clamping rods (Continued)

radially pass through the inner annular surface of the air pressure cavity and the lip ring to be in contact with the diamond. Shaft seals are arranged at the positions where the auxiliary clamping rods pass through the inner annular surface of the air pressure cavity, and the clamping fixture further includes a cavity cover that is mounted on the upper portion of the base shell and covers and wraps the air pressure cavity. The air pressure cavity is internally connected with an external pressure air source pipeline.

6 Claims, 4 Drawing Sheets

(58) Field of Classification Search
CPC ..... B25B 5/147; B25B 11/005; B25B 11/007; B28D 5/0094; B28D 5/0082; B23Q 3/088; B23Q 2703/04; B24B 9/163; B24B 9/167; Y10T 29/23; Y10T 29/49998
See application file for complete search history.

(56) References Cited

FOREIGN PATENT DOCUMENTS

| | | |
|---|---|---|
| CN | 110142617 A | 8/2019 |
| CN | 210999521 U | 7/2020 |
| GN | 1647765 A | 8/2005 |
| GN | 102574261 A | 7/2012 |
| GN | 110142617 A | 8/2019 |

OTHER PUBLICATIONS

The notification of grant of invention patent CN 202011395345.3, issued by CNIPA, dated May 12, 2021.
Search Report in CN 202011395345.3, issued by CNIPA, dated Apr. 30, 2021.

* cited by examiner

MULTI-SET CLAMPING FIXTURE FOR DIAMOND MACHINING

The present application claims the priority of Chinese Patent Application No. CN202011395345.3, filed Dec. 1, 2020, the disclosure of which is hereby incorporated by reference in its entirety.

TECHNICAL FIELD

The invention relates to the technical field of diamond machining, in particular to a multi-set clamping fixture for diamond machining.

BACKGROUND

Diamonds are small parts, and they need to be clamped reliably before being machined. In the prior art, a clamping device for rough machining of a diamond is a general machining device in the traditional mechanical field in which only miniaturization treatment is carried out. However, for diamonds, especially diamond finish machining, specially customized clamps are used such that the universality of the clamps is not high. Besides, to fully guarantee the machining precision, the clamp must fully match the designed size of the diamond to be machined, leading to greatly increased cost in a clamping fixture without providing a high degree of improvement in high-quality holding force. Therefore, the small-size clamping fixture for diamonds is urgently required to have the following properties that: the universality is good, the holding force is stable, and it is preferred that the micro-vibration of the machining process can be compensated with the help of the clamping fixture such that the machining quality is improved.

SUMMARY OF THE INVENTION

It is an object of the present invention to provide a multi-set clamping fixture for diamond machining to solve the problem set forth above in the background art.

In order to solve the technical problem, the invention provides the following technical solutions:

The invention discloses a multi-set clamping fixture for diamond machining, which is used for machining diamonds. The clamping fixture includes a base shell, a lip ring, and a sealing ring. The upper end of the base shell is opened, the lip ring is arranged at the inner ring position of the base shell, an embedding groove is arranged at the inner ring position of the lip ring, the sealing ring is arranged in the embedding groove, a vacuum cavity is formed in the base shell, and the base shell is externally connected with a vacuum pumping pipeline. After the pavilion portion of the diamond to be machined is inserted into the lip ring and supported by the sealing ring, a vacuum cavity is formed in the base shell, and the vacuum cavity is vacuumized by an external pipeline such that the diamond is limited at the position of the lip ring to complete the clamping process, and the top of the diamond is subjected to subsequent machining steps at the moment.

Further, the lip ring is connected with the base shell in a detachable structure. The top position of the base shell is arranged with a mounting stop for positioning and matching with the lip ring, the outer surface of the lip ring also being machined with corresponding positioning features. A hole-shaft transition fit is selected for radial positioning and mounting, an O-shaped ring is arranged on the axial contact surface for sealing, and the detachable lip ring can adapt to diamonds of different sizes.

Further, the clamping fixture includes an auxiliary clamping rod, the auxiliary clamping rod is arranged on the base shell, the center line of the lip ring is taken as an axis, the auxiliary clamping rod surrounds the upper diamond surface by being tightly attached thereto from the radial direction, the auxiliary clamping rod is immediately adjacent to the sealing ring in the axial direction, the number of the arranged auxiliary clamping rods is four or more, the number of the auxiliary clamping rods is an integer multiple of four or six, and the auxiliary clamping rods are provided with structures applying uniform force radially. The auxiliary clamping rod is used for secondary clamping. When only one sealing ring is in contact with the pavilion portion of the diamond, the diamond is unstable in its proceeding position. Because although the vacuum adsorption structure can absorb the diamond to make it attach to the lip ring, the sealing ring needs to be arranged between the lip ring and the pavilion portion of the diamond to achieve a sealing effect in order to prevent the vacuum in the vacuum cavity from leaking outwards. Because the sealing ring is an elastic part, the sealing effect can be realized by adapting it to the profile of the pavilion portion. But one disadvantage of the elastic sealing ring is that the clamping position of the diamond is unstable, the instability referring to a very little position change, for example, the unavoidable vibration in the machining process, subjecting the sealing ring to irregular elastic deformation, and the diamond slightly deviates from the original adsorption position irregularly such that the machining error is caused. Errors can be ignored in the rough machining cutting stage and the top surface planishing stage of the diamond, however, position errors need to be eliminated as much as possible in the grinding and polishing process to prevent unexpected deformation of the final size. According to the invention, by superposing a set of holding structures, the auxiliary clamping rod applies clamping force inwards from the radial direction. The clamping force does not need to be large as long as most of the vibration force is reduced. The force of the auxiliary clamping rod is applied after vacuum adsorption, the vacuum adsorption force serves as a main clamping force, and the force of the auxiliary clamping rod serves as an assisting clamping force.

Further, an annular air pressure cavity is arranged on the outer edge of the upper portion of the base shell, one ends of a plurality of auxiliary clamping rods are located in the air pressure cavity, and one ends of the auxiliary clamping rods radially pass through the inner annular surface of the air pressure cavity and the lip ring to be in contact with the diamond. Shaft seals are arranged at the positions where the auxiliary clamping rods pass through the inner annular surface of the air pressure cavity, and the clamping fixture further includes a cavity cover that is mounted on the upper portion of the base shell and covers and wraps the air pressure cavity. The air pressure cavity is internally connected with an external pressure air source pipeline. The air pressure cavity and the auxiliary clamping rod form an air cylinder structure; however, unlike a common long and straight air cylinder, the air cylinder block of the present application is annular, and multiple air cylinder shafts, i.e. the auxiliary clamping rods, are distributed radially inwards. When the annular air cylinder body is inflated, one end of the auxiliary clamping rod in the air pressure cavity is pushed such that the auxiliary clamping rod moves radially inwards until coming into contact with the surface of the diamond. The auxiliary clamping rods 4 moving radially inwards have the same radial force because the same pressure source is received such that the auxiliary clamping rods keep the same clamping force.

Further, the auxiliary clamping rod comprises a rod body and a push rod, wherein a piston groove body arranged inside one end of the rod body accommodates one end of the push rod, one end of the push rod in the rod body can move axially along the rod body, one end of the push rod located inside the rod body divides a piston groove into a first oil groove and a second oil groove, one end of the push rod located outside the rod body is in contact with the diamond, the first oil groove is led to one end, far away from the push rod, of the rod body through a through hole in the rod body and is arranged with a first joint, the second oil groove is led to one end, far away from the push rod, of the rod body through the through hole in the rod body and is arranged with a second joint, and in the annular air pressure cavity, the joints of the auxiliary clamping rods on a same straight line are connected in a crossed mode through an oil pipe, the first joint being connected with the second joint on the other auxiliary clamping rod 4, and the first oil groove and the second oil groove being filled with oil.

Further, the structure of the rod body and the push rod serve as vibration compensation. When the diamond is vacuum adsorbed and the auxiliary clamping rod is clamped in place, the vibration occurring in the machining process is decomposed to each of two vertical directions, and four auxiliary clamping rods in the two directions are communicated with each other through the oil pipe. When the diamond vibrates upwards, the upper auxiliary clamping rod is squeezed, and the lower auxiliary clamping rod needs to reduce the clamping force slightly, because the clamping force of the lower auxiliary clamping rod aggravates the vibration amplitude of the diamond. At this time, the push rod in the upper auxiliary clamping rod moves upwards, and the first oil groove is compressed. The oil in the first oil groove squeezes the oil in the second oil groove in the lower auxiliary clamping rod through the oil pipe such that the force of the push rod in the lower auxiliary clamping rod radially inwards is reduced, the vibration amplitude of the diamond is reduced, and the complete vibration compensation effect is achieved. This action occurs in the auxiliary clamping rod on each set of position lines. The more the number of auxiliary clamping rods is, the more sufficient the vibration compensation is and the better the degree of coincidence with the vibration direction is. However, the increase in the number of auxiliary clamping rods greatly increases the complexity of the device.

Further, the head of the push rod is spherical. The spherical head can make universal contact with the surface of the diamond.

Further, the auxiliary clamping rod is located at an axial position on the side of the sealing ring facing away from the vacuum cavity. The axial back of the sealing ring is directly connected with the vacuum cavity which is favorable for a full and stable vacuum. If the auxiliary clamping rod is between the sealing ring and the vacuum cavity, the precision of shaft seal at the position where the auxiliary clamping rod passes out of the air pressure cavity needs to be high because one side is vacuum and one side is pressurized. Of course, the vacuum in the vacuum cavity can cooperate with the lower air pressure in the air pressure cavity to realize the radial movement of the auxiliary clamping rod.

A bevel is provided on the inner ring of the lip ring, a connecting hole or pipe is provided between the air pressure cavity and the bevel, and part of the pressure gas in the air pressure cavity is led to an annular gap between the bevel and the diamond. The sealing of the sealing ring cannot be guaranteed to be completely reliable, but the vacuum adsorption capacity is not affected by extremely slight gas leakage. But gas flow occurs at the leakage position where the sealing ring and the diamond contact the sealing surface, and the part of the gas flow sucks air at the machining position of the diamond. If the extremely fine diamond particles flow to the position of the sealing ring along with the air, the position of the pavilion portion of the diamond can be scratched such that an annular air layer can be formed by leading a part of the air in the air pressure cavity. The hardness of the air from the air pressure cavity is lower than that of the diamond even if slight dust exists, and therefore scratching cannot occur.

The embedding groove is a dovetail groove. Dovetail groove is anti-falling.

Compared with the prior art, the invention has the beneficial effects that: the main clamping effect is realized through vacuum adsorption, and it can self-adapt to the pavilion portion of a diamond with different shapes and regular polygons; due to the elastic adaptability obtained by the deformation of the sealing ring during vacuum adsorption, radial holding is carried out through the semi-rigid contact auxiliary clamping rod after vacuum adsorption is finished; the holding of the auxiliary clamping rod serves as auxiliary holding such that the displacement probability of the diamond is greatly reduced; the double telescopic structure of the rod body and the push rod in the auxiliary clamping rod can compensate the vibration of the machining process; when a vibration towards one side occurs, the clamping force on the other side can be automatically relieved such that the amplitude of the vibration is reduced and the rapid reset is achieved.

BRIEF DESCRIPTION OF THE DRAWINGS

The accompanying drawings, which are included to provide a further understanding of the invention and are incorporated in and constitute a part of this description, together with the embodiments of the present invention, illustrate the present invention, and do not constitute a limitation to the present invention. In the drawings.

In the figures: 1—base shell, 11—vacuum cavity, 12—mounting stop, 13—air pressure cavity, 2—lip ring, 21—bevel, 22—embedding groove, 23—rod penetrating hole, 3—sealing ring, 4—auxiliary clamping rod, 41—rod body, 411—first oil groove, 412—second oil groove, 42—push rod, 431—first joint, 432—second joint, 5—cavity cover, 6—oil pipe, and 9—diamond.

DETAILED DESCRIPTION OF THE PREFERRED EMBODIMENTS

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by a person of ordinary skills in the art without involving any inventive effort are within the scope of the present invention.

Figure 1:
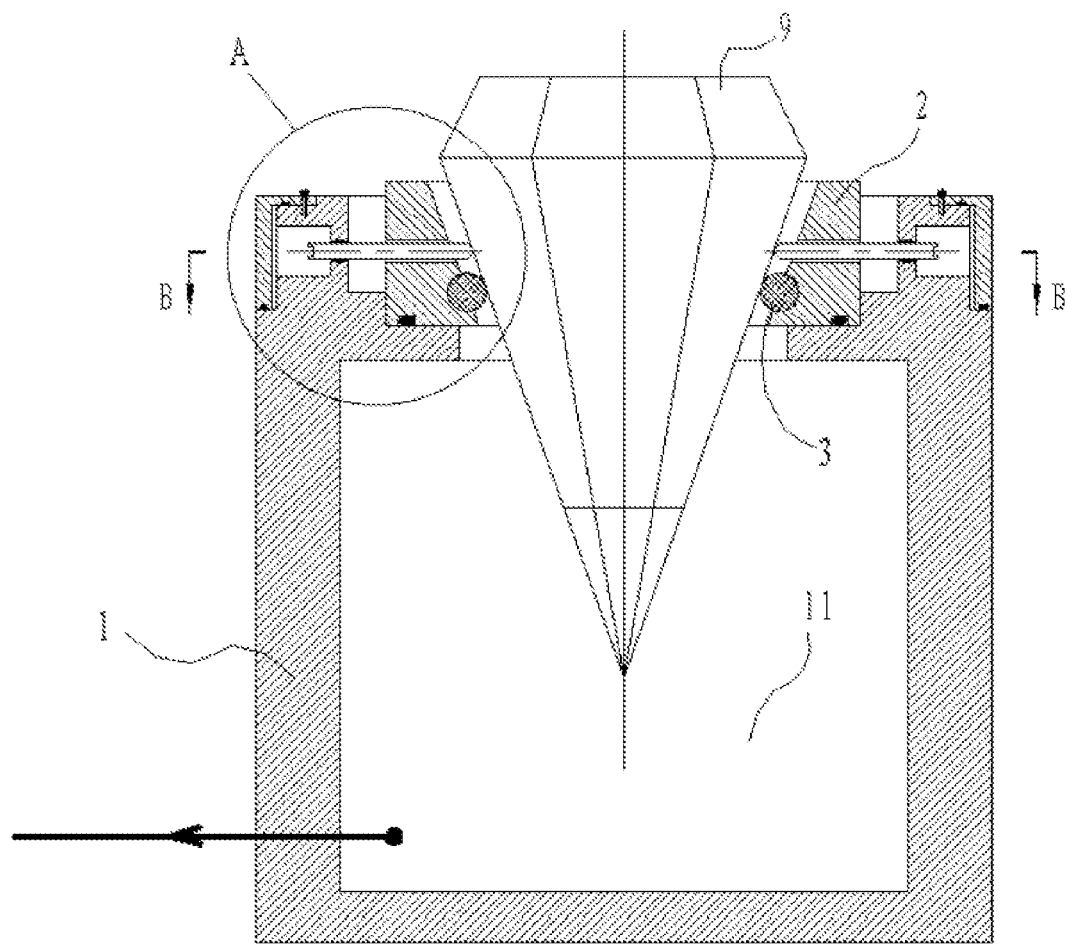
FIG. 1 is a schematic view showing an overall structure of the present invention.

Referring to FIGS. 1-4, the present invention provides technical solutions as below:

A multi-set clamping fixture for diamond machining is used for machining a diamond 9. The clamping fixture includes a base shell 1, a lip ring 2, and a sealing ring 3. The upper end of the base shell 1 is opened, the lip ring 2 is arranged at an inner ring position of the base shell 1, an embedding groove 22 is arranged at the inner ring position of the lip ring 2, the sealing ring 3 is arranged in the embedding groove 22, a vacuum cavity 11 is formed in the base shell 1, and the base shell 1 is externally connected with a vacuum pumping pipeline. As shown in FIG. 1, after the pavilion portion of the diamond 9 to be machined is inserted into the lip ring 2 and supported by the sealing ring 3, a vacuum cavity 11 is formed in the base shell 1, and the vacuum cavity 11 is vacuumized by an external pipeline such that the diamond is limited at the position of the lip ring 2 to complete the clamping process, and the top of the diamond 9 is subjected to subsequent machining steps at the moment.

Figure 2:
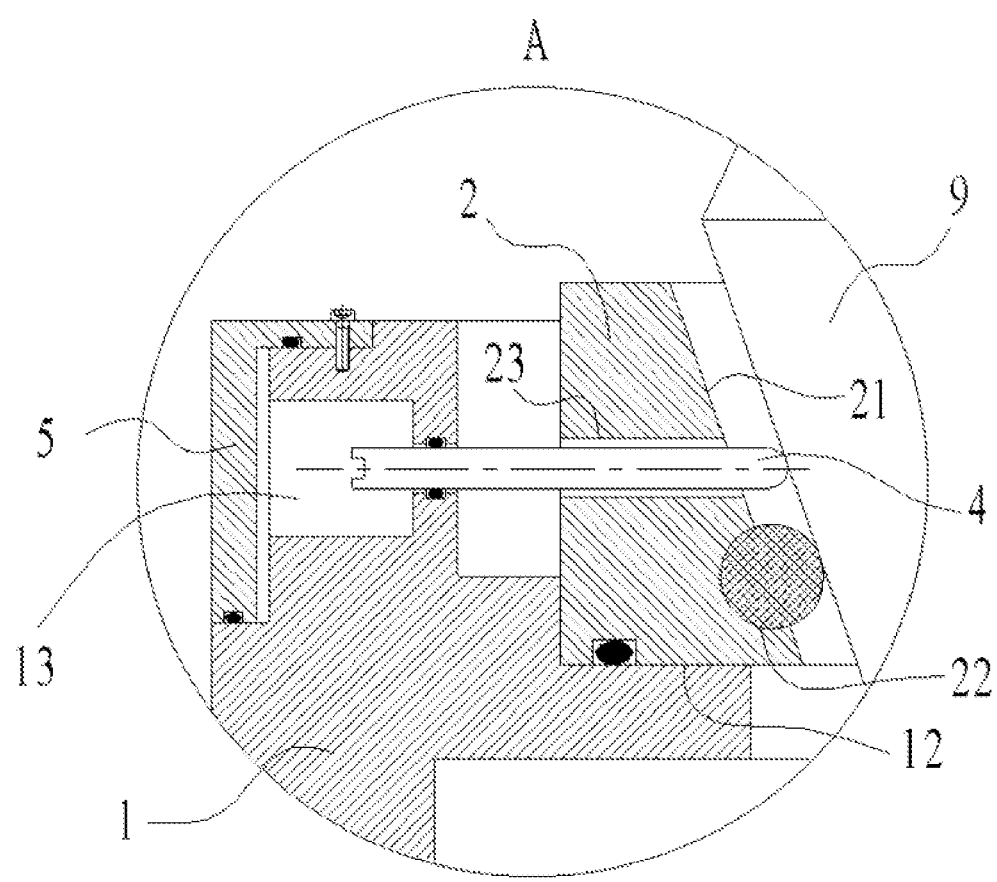
FIG. 2 is view A of FIG. 1.

The lip ring 2 is connected with the base shell 1 in a detachable structure. As shown in FIGS. 1 and 2, the top position of the base shell 1 is arranged with a mounting stop 12 for positioning and matching with the lip ring 2, the outer surface of the lip ring 2 also being machined with corresponding positioning features. A hole-shaft transition fit is selected for radial positioning and mounting, an O-shaped ring is arranged on the axial contact surface for sealing, and the detachable lip ring 2 can adapt to diamonds 9 with different sizes.

The clamping fixture further includes an auxiliary clamping rod 4, the auxiliary clamping rod 4 is arranged on the base shell 1, the center line of the lip ring 2 is taken as an axis, the auxiliary clamping rod 4 surrounds the upper diamond 9 surface by being tightly attached thereto from the radial direction, the auxiliary clamping rod 4 is immediately adjacent to the sealing ring 3 in the axial direction, the number of the arranged auxiliary clamping rods 4 is four or more, the number of the auxiliary clamping rods 4 is an integer multiple of four or six, and the auxiliary clamping rods 4 are provided with structures applying uniform force radially. The auxiliary clamping rod 4 is used for secondary clamping. When only one sealing ring 3 is in contact with the pavilion portion of the diamond 9, the diamond 9 is unstable in proceeding position. Because although the vacuum adsorption structure can absorb the diamond 9 to make it attach to the lip ring 2, the sealing ring 3 needs to be arranged between the lip ring 2 and the pavilion portion of the diamond 9 to achieve a sealing effect in order to prevent the vacuum in the vacuum cavity 11 from leaking outwards. Because the sealing ring 3 is an elastic part, the sealing effect can be realized by adapting it to the profile of the pavilion portion. But one disadvantage of the elastic sealing ring 3 is that the clamping position of the diamond 9 is unstable, the instability referring to a very little position change, for example, the unavoidable vibration in the machining process, subjecting the sealing ring 3 to irregular elastic deformation, and the diamond 9 slightly deviates from the original adsorption position irregularly such that the machining error is caused. Errors can be ignored in the rough machining cutting stage and the top surface planishing stage of the diamond, however, position errors need to be eliminated as much as possible in the grinding and polishing process to prevent unexpected deformation of the final size.

According to the invention, by superposing a set of holding structures, the auxiliary clamping rod 4 applies clamping force inwards from the radial direction. The clamping force does not need to be large as long as most of the vibration force is reduced. The force of the auxiliary clamping rod 4 is applied after vacuum adsorption, the vacuum adsorption force serves as a main clamping force, and the force of the auxiliary clamping rod 4 serves as an assisting clamping force.

Figure 4:
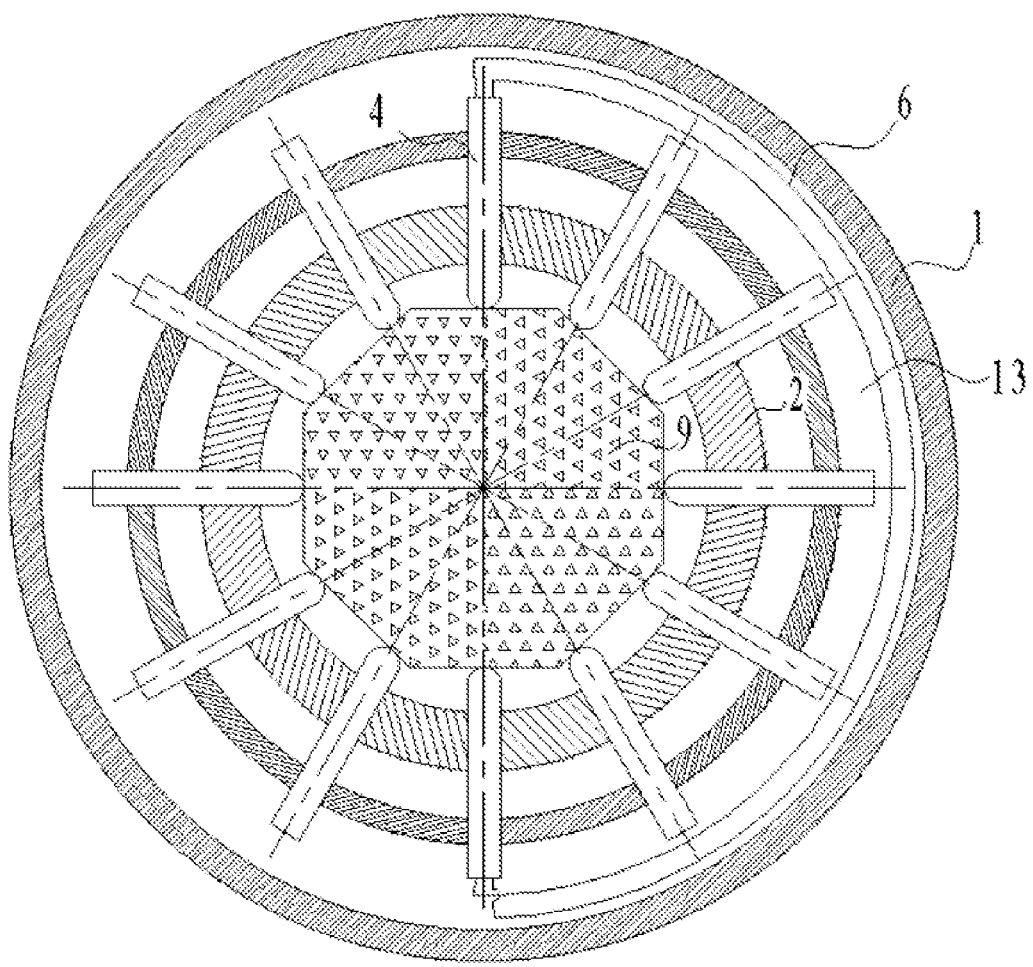
FIG. 4 is view B-B of FIG. 1.

An annular air pressure cavity 13 is arranged on the outer edge of the upper portion of the base shell 1, one ends of a plurality of auxiliary clamping rods 4 are located in the air pressure cavity 13, and one ends of the auxiliary clamping rods 4 radially pass through the inner annular surface of the air pressure cavity 13 and the lip ring 2 to be in contact with the diamond 9. Shaft seals are arranged at the positions where the auxiliary clamping rods 4 pass through the inner annular surface of the air pressure cavity 13, and the clamping fixture further includes a cavity cover 5 which is mounted on the upper portion of the base shell 1 and covers and wraps the air pressure cavity 13. The air pressure cavity 13 is internally connected with an external pressure air source pipeline. The air pressure cavity 13 and the auxiliary clamping rod 4 form an air cylinder structure; however, unlike a common long and straight air cylinder, the air cylinder block of the present application is annular, and multiple air cylinder shafts, i.e. the auxiliary clamping rods 4, are distributed radially inwards, as shown in FIG. 4. When the annular air cylinder body is inflated, one end of the auxiliary clamping rod 4 in the air pressure cavity 13 is pushed such that the auxiliary clamping rod 4 moves radially inwards until coming into contact with the surface of the diamond 9. The auxiliary clamping rods 4 moving radially inwards have the same radial force, because the same pressure source is received such that the auxiliary clamping rods keep the same clamping force.

The auxiliary clamping rod 4 includes a rod body 41 and a push rod 42. A piston groove body arranged inside one end of the rod body 41 accommodates one end of the push rod 42. The piston groove body is a chamber in one end of the push rod 42. One end of the push rod 42 located inside the rod body 41 can move axially along the rod body 41, one end of the push rod 42 located inside the rod body 41 divides the chamber of the piston groove body into a first oil groove 411 and a second oil groove 412, and one end of the push rod 42 located outside the rod body 41 is in contact with the diamond 9. The first oil groove 411 is led to one end, far away from the push rod 42, of the rod body 41 through a through hole in the rod body and is arranged with a first joint 431. The second oil groove 412 is led to one end, far away from the push rod 42, of the rod body 41 through a through hole in the rod body and is arranged with a second joint 432. In the annular air pressure cavity 13, the joints of the auxiliary clamping rods 4 on the same straight line are connected in a crossed mode through the oil pipe 6, a first joint 431 being connected with a second joint 432 on the other auxiliary clamping rod 4, and the first oil groove 411 and the second oil groove 412 being filled with oil.

Figure 3:
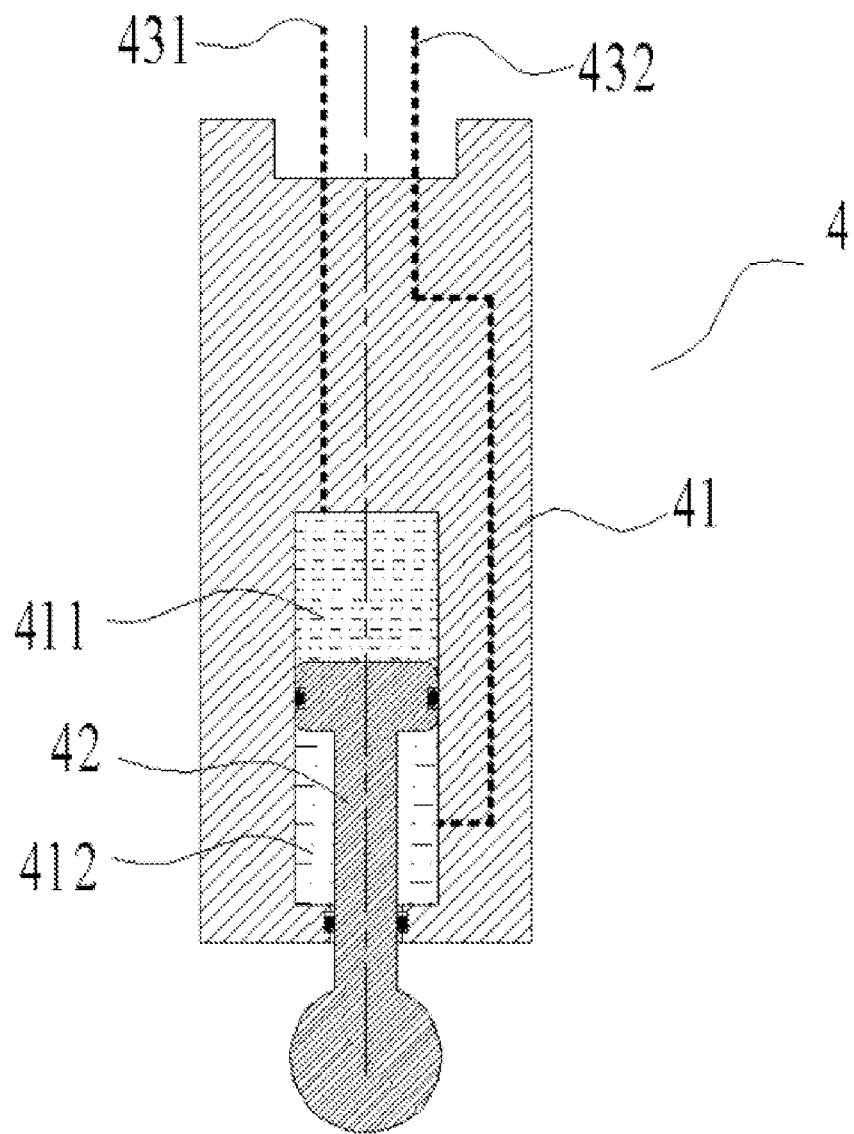
FIG. 3 is a schematic view showing a structure of an auxiliary clamping rod of the present invention.

The structure of the rod body 41 and the push rod 42 serve as vibration compensation, as shown in FIGS. 3 and 4. When the diamond 9 is vacuum adsorbed and the auxiliary clamping rod 4 is clamped in place, the vibration occurring in the machining process is decomposed to each of two vertical directions, and four auxiliary clamping rods 4 in the two directions are communicated with each other through the oil pipe 6. Only the communication of two auxiliary clamping rods 4 on the same straight line is shown in FIG. 4.

Analyzing in the view direction of FIG. 4, when the diamond 9 vibrates upwards, the upper auxiliary clamping rod 4 is squeezed, and the lower auxiliary clamping rod 4 needs to reduce the clamping force slightly, because the clamping force of the lower auxiliary clamping rod 4 aggravates the vibration amplitude of the diamond 9. At this time, the push rod 42 in the upper auxiliary clamping rod 4 moves upwards, and the first oil groove 411 is compressed. The oil in the first oil groove 411 squeezes the oil in the second oil groove 412 in the lower auxiliary clamping rod 4 through the oil pipe such that the force of the push rod 42 in the lower auxiliary clamping rod 4 radially inwards is reduced, the vibration amplitude of the diamond 9 is reduced, and the complete vibration compensation effect is achieved. This action occurs in the auxiliary clamping rod 4 on each set of position lines. The more the number of auxiliary clamping rods 4 is, the more sufficient the vibration compensation is and the better the degree of coincidence with the vibration direction is. However, the increase in the number of auxiliary clamping rods 4 greatly increases the complexity of the device. The head of the push rod 42 is spherical. The spherical head can make universal contact with the surface of the diamond 9.

The auxiliary clamping rod 4 is located at an axial position on the side of the sealing ring 3 facing away from the vacuum cavity 11. The axial back of the sealing ring 3 is directly connected with the vacuum cavity 11 which is favorable for a full and stable vacuum. If the auxiliary clamping rod 4 is between the sealing ring 3 and the vacuum cavity 11, the precision of shaft seal at the position where the auxiliary clamping rod 4 passes out of the air pressure cavity 13 needs to be high because one side is vacuum and one side is pressurized. Of course, the vacuum in the vacuum cavity 11 can cooperate with the lower air pressure in the air pressure cavity 13 to realize the radial movement of the auxiliary clamping rod 4. A bevel 21 is provided on the inner ring of the lip ring 2, a connecting hole or pipe is provided between the air pressure cavity 13 and the bevel 21, and part of the pressure gas in the air pressure cavity 13 is led to an annular gap between the bevel 21 and the diamond 9. The sealing of the sealing ring 3 cannot be guaranteed to be completely reliable, but the vacuum adsorption capacity is not affected by extremely slight gas leakage. But gas flow occurs at the leakage position where the sealing ring 3 and the diamond 9 contact the sealing surface, and the part of the gas flow sucks air at the machining position of the diamond 9. If the extremely fine diamond particles flow to the position of the sealing ring 3 along with the air, the position of the pavilion portion of the diamond 9 can be scratched such that an annular air layer can be formed by leading a part of the air in the air pressure cavity 13. The hardness of the air from the air pressure cavity 13 is lower than that of the diamond even if slight dust exists, and therefore scratching cannot occur. The embedding groove 22 is a dovetail groove. Dovetail groove is anti-falling.

It should be noted that in this application, relational terms such as first and second, and the like are used solely to distinguish one entity or operation from another entity or operation without necessarily requiring or implying any such actual relationship or order between such entities or operations. Moreover, the terms "include", "comprise", or any other variation thereof, are intended to cover a non-exclusive inclusion, such that a process, method, article, or equipment that comprises a list of elements does not comprise only those elements but may include other elements not expressly listed or inherent to such process, method, article, or equipment.

Finally, it should be noted that the above descriptions are only preferred embodiments of the present invention and are not intended to limit the present invention. Although the present invention has been described in detail with reference to the foregoing embodiments, for those skilled in the art, they can still modify the technical solutions described in the foregoing embodiments, or equivalently replace some of the technical features. Any modification, equivalent replacement, improvement, etc., made within the spirit and principle of the present invention shall be included in the protection scope of the present invention.

The invention claimed is:
1. A multi-set clamping fixture for diamond machining which is used for machining a diamond (9), characterized in that the clamping fixture comprises:
  a base shell (1), a lip ring (2), and a sealing ring (3), wherein an upper end of the base shell (1) is opened, the lip ring (2) is arranged at an inner ring position of the base shell (1), an embedding groove (22) is arranged at the inner ring position of the lip ring (2), the sealing ring (3) is arranged in the embedding groove (22), a vacuum cavity (11) is formed in the base shell (1), and the base shell (1) is externally connected with a vacuum pumping pipeline;
  the clamping fixture further comprises a plurality of auxiliary clamping rods (4), wherein each auxiliary clamping rod of the plurality of auxiliary clamping rods (4) is arranged on the base shell (1), a center line of the lip ring (2) is taken as an axis, the plurality of auxiliary clamping rods (4) surrounds an upper diamond (9) surface by being tightly attached thereto from a radial direction, the plurality of auxiliary clamping rods (4) are immediately adjacent to the sealing ring (3) in an axial direction, wherein the plurality of auxiliary clamping rods comprise a quantity of at least four auxiliary clamping rods (4), the quantity of the auxiliary clamping rods (4) is an integer multiple of four or six, and each auxiliary clamping rod (4) is provided with structures configured to apply uniform force radially;
  wherein an annular air pressure cavity (13) is arranged on an outer edge of an upper portion of the base shell (1), one end of each of the plurality of auxiliary clamping rods (4) is located in the air pressure cavity (13), each auxiliary clamping rod (4) radially passes through an inner annular surface of the air pressure cavity (13) and the lip ring (2) to be in contact with the diamond (9), shaft seals are arranged at positions where each auxiliary clamping rod (4) passes through the inner annular surface of the air pressure cavity (13), the clamping fixture further comprises a cavity cover (5) which is mounted on the upper portion of the base shell (1) and covers and wraps the air pressure cavity (13), and the air pressure cavity (13) is internally connected with an external pressure air source pipeline;
  wherein each of the auxiliary clamping rods (4) comprise:
    a rod body (41) and a push rod (42),
      wherein a piston groove body arranged inside one end of the rod body (41) accommodates one end of the push rod (42),
      said one end of the push rod (42) in the rod body (41) can move axially along the rod body (41),
      said one end of the push rod (42) located inside the rod body (41) divides the piston groove body into a first oil groove (411) and a second oil groove (412), a second end of the push rod (42) located outside the rod body (41) is configured to be in contact with the diamond (9), the first oil groove (411) communicates with a first joint (431) through a through hole located in a second end of the rod body (41), the second oil groove (412) communicates with a second joint (432) through the through hole located in the second end of the rod body (41), and in the annular air pressure cavity (13), each first joint (431) of each auxiliary clamping rod (4) is connected with the second joint (432) of the auxiliary clamping rod arranged oppositely and coaxially therefrom in a crossed mode through an oil pipe (6), and each first oil groove (411) and each second oil groove (412) being filled with oil.

2. The multi-set clamping fixture for diamond machining according to claim 1, characterized in that: the lip ring (2) is connected with the base shell (1) in a detachable structure.

3. The multi-set clamping fixture for diamond machining according to claim 1, characterized in that: a head of the push rod (42) is spherical.

4. The multi-set clamping fixture for diamond machining according to claim 1, characterized in that: the auxiliary clamping rod (4) is located at an axial position on one side of the sealing ring (3) facing away from the vacuum cavity (11).

5. The multi-set clamping fixture for diamond machining according to claim 4, characterized in that: a bevel (21) is provided on an inner ring of the lip ring (2), a connecting hole or pipe is provided between the air pressure cavity (13) and the bevel (21), and part of pressure gas in the air pressure cavity (13) is led to an annular gap between the bevel (21) and the diamond (9).

6. The multi-set clamping fixture for diamond machining according to claim 1, characterized in that: the embedding groove (22) is a dovetail groove.

* * * * *